(12) United States Patent
Hsu (10) Patent No.: US 9,137,505 B2
(45) Date of Patent: Sep. 15, 2015

(54) LONG-RANGE VGA IMAGE TRANSMISSION SYSTEM PROVIDING AUTOMATIC IMAGE ADJUSTMENT

(71) Applicant: C&C TECHNIC TAIWAN CO., LTD., New Taipei (TW)

(72) Inventor: Huei Chung Hsu, New Taipei (TW)

(73) Assignee: C&C TECHNIC TAIWAN CO., LTD., New Taipei (TW)

( * ) Notice: Subject to any disclaimer, the term of this patent is extended or adjusted under 35 U.S.C. 154(b) by 410 days.

(21) Appl. No.: 13/760,864

(22) Filed: Feb. 6, 2013

(65) Prior Publication Data
US 2014/0218541 A1    Aug. 7, 2014

(51) Int. Cl.
*H04N 5/52*     (2006.01)
*H04N 9/64*     (2006.01)
*G09G 5/36*     (2006.01)
*H04N 7/10*     (2006.01)

(52) U.S. Cl.
CPC ............... *H04N 9/646* (2013.01); *G09G 5/363* (2013.01); *H04N 7/108* (2013.01)

(58) Field of Classification Search
CPC ....................................................... H04N 17/00
USPC ......... 348/180–181, 189, 192, 642, 687, 688, 348/678, 679
See application file for complete search history.

(56) References Cited

U.S. PATENT DOCUMENTS

| | | | | |
|---|---|---|---|---|
| 5,376,971 A * | 12/1994 | Kadono et al. | | 348/699 |
| 5,557,417 A * | 9/1996 | Ishii | | 386/264 |
| 6,337,710 B1 * | 1/2002 | Watkins | | 348/180 |
| 6,584,154 B1 * | 6/2003 | Wu | | 375/240.16 |
| 9,025,867 B2 * | 5/2015 | Cote et al. | | 382/162 |
| 2012/0086814 A1 * | 4/2012 | Tsubaki et al. | | 348/192 |
| 2012/0236927 A1 * | 9/2012 | Nakagawa | | 375/240.01 |
| 2013/0022123 A1 * | 1/2013 | Ueda et al. | | 375/240.16 |
| 2013/0265445 A1 * | 10/2013 | Argyropoulos et al. | | 348/192 |

* cited by examiner

*Primary Examiner* — Paulos M Natnael
(74) *Attorney, Agent, or Firm* — Shimokaji IP (57) ABSTRACT

A long-range VGA image transmission system includes an image output source for providing a first image signal; a test circuit for providing a test signal; an image encoding and transmitting circuit for encoding the first image signal and test signal to generate a transmission signal; an image decoding and receiving circuit for receiving and decoding the transmission signal to generate a second image signal and the test signal; an image detection and comparison circuit for receiving, detecting and comparing the second image signal with the test signal to generate an adjustment signal; an image-enhancement compensation circuit for receiving the adjustment signal to automatically adjust the second image signal and generate a third image signal; and an image display device for receiving the second image signal and then receiving the third image signal after the image adjustment. Therefore, manpower cost and possible failure of image adjustment with naked eye is eliminated.

16 Claims, 11 Drawing Sheets

Image output source

First image signal

Image encoding and transmitting circuit

First image signal + Test signal

LONG-RANGE VGA IMAGE TRANSMISSION SYSTEM PROVIDING AUTOMATIC IMAGE ADJUSTMENT

FIELD OF THE INVENTION

The present invention relates to a VGA image system for transmitting signal in an analog format, and more particularly to a long-range VGA image transmission system that has an image detection and comparison circuit to enable automatic adjustment of a VGA image being transmitted over a long distance.

BACKGROUND OF THE INVENTION

The currently available extension cables for image transmission include VGA (Video Graphics Array) extension cable, DVI (Digital Visual Interface) extension cable, and HDMI (High-Definition Multimedia Interface) extension cable. The VGA cable is used to transmit only analog signals, while the DVI cable can be used to transmit both analog and digital signals. However, both the VGA and the DVI cable could not be used to transmit audio signals. On the other hand, the HDMI cable can be used to transmit digital signals, audio signals and different network data.

A VGA extender, which is commercially available in the market, is often used in long-distance analog signal transmission. However, even with the VGA extender, signal delay or signal attenuation would still occur if the transmission cable between an image output source and an image display device is excessively long. As a result, in the case of a long-range transmission over 40 meters, the VGA image signal played back at a remote location is subjected to the following distortion conditions: (1) reduced image brightness, (2) blurry image, and (3) unsynchronized RGB colors.

Figure 1:
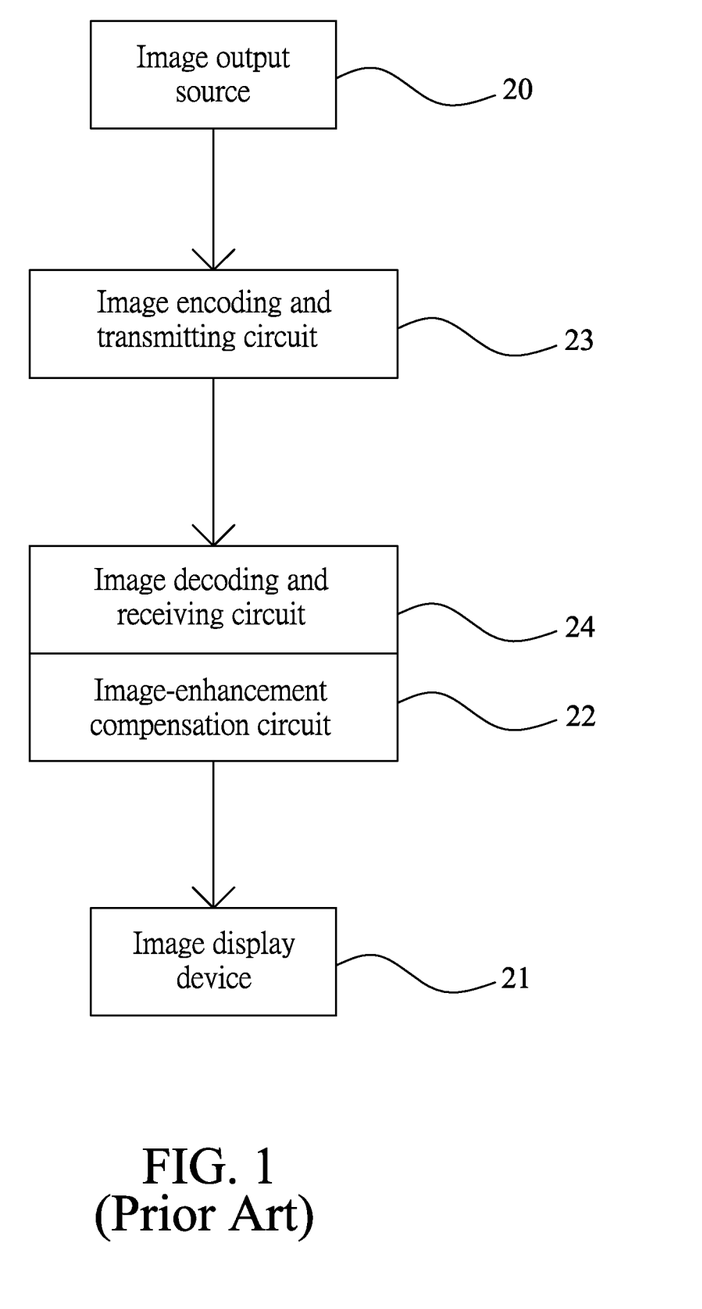
FIG. 1 is a conceptual diagram of a conventional long-range VGA image transmission system requiring manual image adjustment.

Please refer to FIG. 1, which is a conceptual diagram of a conventional long-range VGA image transmission system requiring manual image adjustment. As shown, an image-enhancement compensation circuit 22 must be provided between an image output source 20, such as a computer, and an image display device 21, such as a screen, so that an output image signal transmitted via an image encoding and transmitting circuit 23 to an image decoding and receiving circuit 24 can be adjusted via the image-enhancement compensation circuit 22 to correct any distortion thereof. An operator has to observe the image display device 21 with the naked eye to check the distortion conditions and makes adjustment and compensation of different degrees according to different distortion conditions, so that the image after compensation can have an image quality closer to that of the original image signal from the image output source 20.

A disadvantage in using the image-enhancement compensation circuit is that the image signal is manually adjusted. Thus, extra manpower is required to do image adjustment during the electromechanical work in general building construction. This would cause difficulties in installing the transmission system and increased labor cost. Further, in installing the image display system in a working site, the operator has to determine the values for five different image adjustment functions through observation with the naked eye. Therefore, an experienced operator is needed to perform such image adjustments, so that the image can be accurately adjusted to have a quality close to that of the original image. Frequently, the image adjusted by an operator of insufficient experience would still have some degree of distortion when it is displayed on the image display device.

In view that the conventional long-range VGA image transmission system requiring manual image adjustment has the disadvantages of uneasy to make accurate adjustment and requiring extra labor cost, it is tried by the inventor to develop an improved long-range VGA image transmission system that provides automatic image adjustment to overcome the disadvantages in the prior art.

SUMMARY OF THE INVENTION

A primary object of the present invention is to provide a long-range VGA image transmission system providing automatic image adjustment, so as to improve the conventional image correction and adjustment with the naked eye by an operator, to reduce the manpower cost for image adjustment, and to avoid the condition of displaying a distorted image on an image display device due to a failed image adjustment by an operator of insufficient experience.

Another object of the present invention is to provide a long-range VGA image transmission system, according to which a test signal is added to an image signal provided by an image output end, so that the output image signal that becomes distorted after long-distance transmission can be automatically adjusted with the test signal and recovered at a signal receiving end, enabling the image shown on an image display device has the same quality as that of the original image.

To achieve the above and other objects, the long-range VGA image transmission system providing automatic image adjustment according to the present invention mainly includes an image output source, a test circuit, an image encoding and transmitting circuit, an image decoding and receiving circuit, an image-enhancement compensation circuit, an image detection and comparison circuit, and an image display device.

The image output source provides a first image signal, which has multiple visible zones spaced alternately with multiple invisible zones. The test circuit independently provides a test signal. The image encoding and transmitting circuit is electrically connected to the image output source and the test circuit to receive the first image signal and the test signal, and adds the test signal to the invisible zones of the first image signal before generating a transmission signal through encoding.

The image decoding and receiving circuit is electrically connected to the image encoding and transmitting circuit for receiving and decoding the transmission signal to generate a second image signal and the test signal. The image-enhancement compensation circuit is electrically connected to the image decoding and receiving circuit for receiving and transmitting the second image signal and the test signal.

The image detection and comparison circuit is electrically connected to the image-enhancement compensation circuit for receiving the second image signal and the test signal, and detecting and comparing the second image signal with the test signal to generate an adjustment signal. The image display device is electrically connected to the image-enhancement compensation circuit for receiving the second image signal.

The image-enhancement compensation circuit receives the adjustment signal and then automatically adjusts the second image signal to generate a third image signal; and the image display device starts receiving the third image signal after the adjustment made by the image detection and comparison circuit, and displays an image based on the third image signal.

In a preferred embodiment of the present invention, the image detection and comparison circuit is composed of an RGB time comparison circuit, an image sharpness detection circuit and an image brightness detection circuit; and the adjustment signal is composed of an RGB compensation signal, an image sharpness compensation signal and a gain compensation signal.

The RGB time comparison circuit detects any time delay among three primary light colors of RGB of the second image signal, and uses one of the primary light colors that has the largest time delay as a reference to control and increase delay signals to the other two leading primary light colors until there is not any time delay among the three primary light colors.

The image sharpness detection circuit detects for a threshold voltage result. When it is determined the image sharpness needs to be decreased, the image sharpness detection circuit first sets an image sharpness compensation control signal to a highest value thereof and then decreases the compensation signal step by step until the detection result changes. On the other hand, when it is determined the image sharpness needs to be increased, the image sharpness detection circuit first sets an image sharpness compensation control signal to a lowest value thereof and then increases the compensation signal step by step until the detection result changes.

The image brightness detection circuit detects for a target voltage value of the second image signal. When a measured voltage value is lower than the target voltage value, the image brightness detection circuit first sets a gain compensation signal to a smallest value thereof and then increases the compensation signal step by step until the detection result changes. On the other hand, when a measured voltage is higher than the target voltage value, the image brightness detection circuit first sets a gain compensation signal to a largest value thereof and then decreases the compensation signal step by step until the detection result changes.

In an operable embodiment of the present invention, the image encoding and transmitting circuit and the image decoding and receiving circuit are electrically connected to each other via a twisted pair cable, and the twisted pair cable can be any one of a CAT5 cable, a CAT5E cable and a CAT6 cable.

The present invention is characterized in that the long-range VGA image transmission system includes in its design the image detection and comparison circuit and the image-enhancement compensation circuit that cooperates with the image detection and comparison circuit to enable automatic image adjustment, so that the image signal that becomes distorted after long-distance transmission can be automatically adjusted with the test signal provided by the test circuit in the image output end and recovered at the signal receiving end without the need of being corrected and adjusted by an operator with the naked eye. In this manner, it is able to reduce the manpower cost for image adjustment and avoid the condition of still having a distorted image shown on the image display device after the image adjustment by an operator of insufficient experience.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and with reference to the accompanying drawings.

Figure 2:
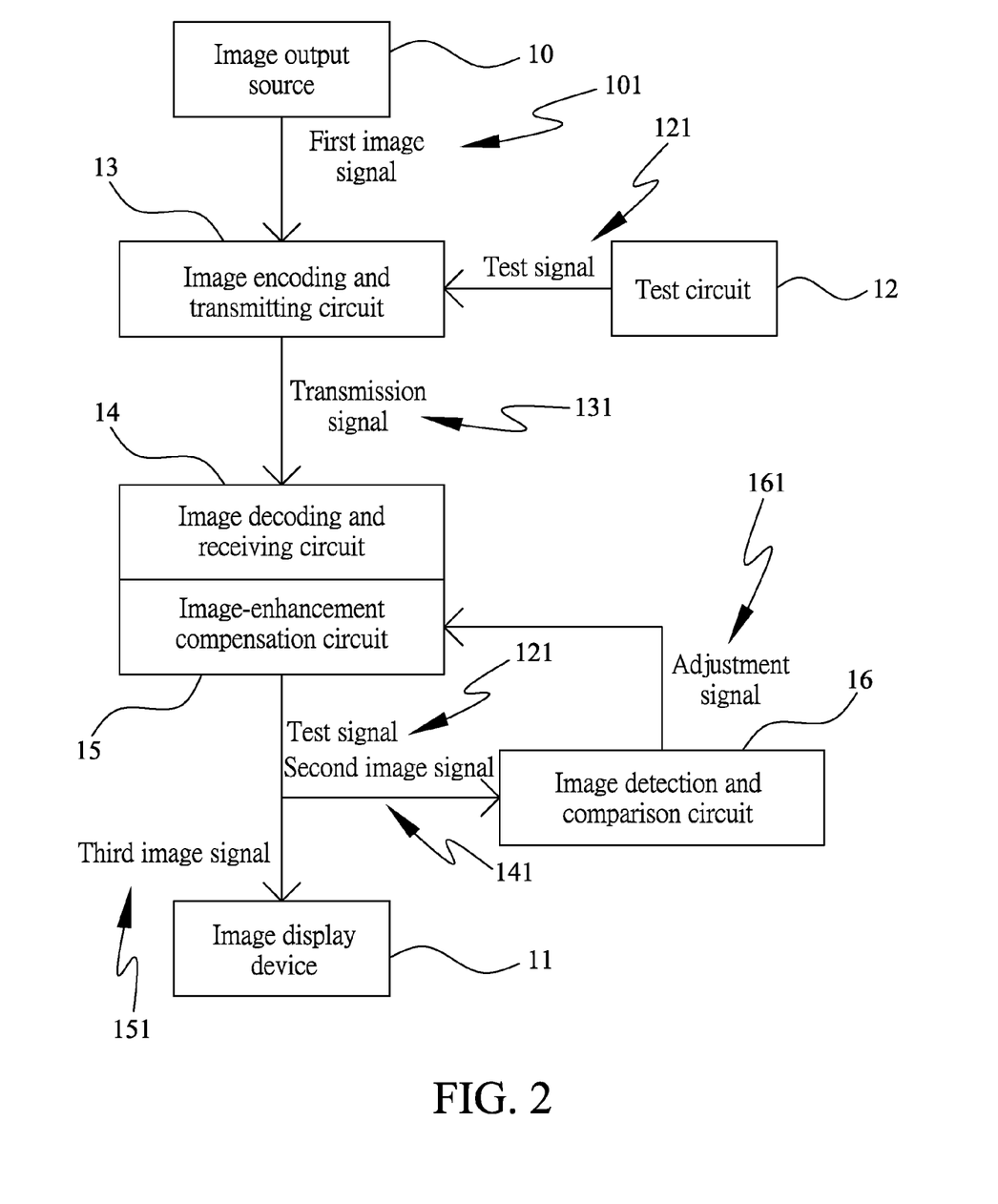
FIG. 2 is a conceptual diagram of a long-range VGA image transmission system providing automatic image adjustment according to a preferred embodiment of the present invention.

Please refer to FIG. 2 that is a conceptual diagram of a long-range VGA image transmission system providing automatic image adjustment according to a preferred embodiment of the present invention. For the purpose of conciseness and clarity, the present invention is also briefly referred to as the long-range VGA image transmission system herein. As shown, the long-range VGA image transmission system is mainly used between an image output source 10, such as a computer, and an image display device 11, such as a screen. And, to achieve even better automatic VGA image adjustment effect from the long-range VGA image transmission system of the present invention, the image output source 10 and the image display device 11 are preferably distant from each other by more than 50 meters.

As shown, the long-range VGA image transmission system of the present invention further includes a test circuit 12, an image encoding and transmitting circuit 13, an image decoding and receiving circuit 14, an image-enhancement compensation circuit 15 and an image detection and comparison circuit 16, which are connected to between the image output source 10 and the image display device 11.

The image encoding and transmitting circuit 13 is electrically connected to the image output source 10 and the test circuit 12; the image decoding and receiving circuit 14 is electrically connected to the image encoding and transmitting circuit 13; the image-enhancement compensation circuit 15 is electrically connected to the image decoding and receiving circuit 14 and the image display device 11; and the image detection and comparison circuit 16 is electrically connected to the image-enhancement compensation circuit 15. In the present invention, the image encoding and transmitting circuit 13 and the image decoding and receiving circuit 14 are electrically connected to each other via a twisted pair cable. In practical implementation of the present invention, the twisted pair cable can be any one of a CAT5 cable, a CAT5E cable and a CAT6 cable.

Figure 3:
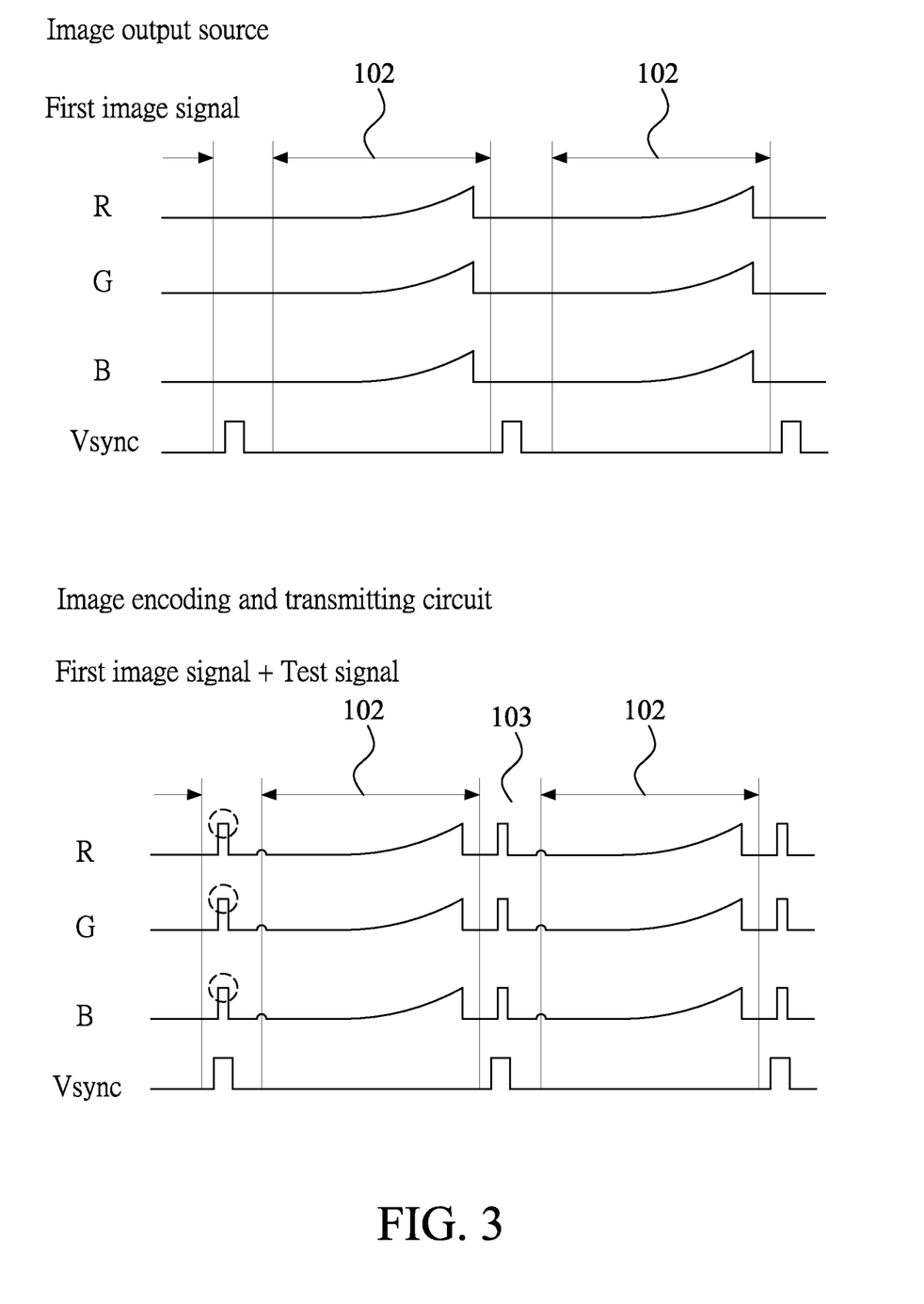
FIG. 3 shows the adding of a test signal to a first image signal according to the long-range VGA image transmission system of the present invention.

Please refer to FIG. 3. The image output source 10 provides a first image signal 101, which has multiple visible zones 102 spaced alternately with multiple invisible zones 103. The test circuit 12 independently provides a test signal 121. The image encoding and transmitting circuit 13 receives the first image signal 101 and the test signal 121, and adds the test signal to the invisible zones 103 of the first image signal 101 before generating a transmission signal 131 through encoding.

The first image signal 101 is composed of R, G, B, $H_{sync}$ and $V_{sync}$ voltage signals. As shown in FIG. 3, since the test signal 121 is added to the invisible zones 103 in the R, G, B voltage signals, a viewer would not perceive the test signal 121 in the displayed image when the image is subsequently played back on the image display device 11.

Please refer back to FIG. 2. The image decoding and receiving circuit 14 receives and decodes the transmission signal 131 to generate a second image signal 141 and the test signal 121; the image-enhancement compensation circuit 15 directly receives the second image signal 141 and the test signal 121 from the image decoding and receiving circuit 14 and transmits the second image signal 141 to the image display device 11; and the image detection and comparison circuit 16 is electrically connected to the image-enhancement compensation circuit 15 for receiving the second image signal 141 and the test signal 121. The image detection and comparison circuit 16 detects and compares the second image signal 141 with the test signal 121 to thereby generate an adjustment signal 161 to the image-enhancement compensation circuit 15. The image display device 11 is electrically connected to the image-enhancement compensation circuit 15, so as to receive the second image signal 141.

On receipt of the adjustment signal 161, the image-enhancement compensation circuit 15 automatically adjusts the second image signal 141 to generate a third image signal 151. After the adjustment made by the image detection and comparison circuit 16, the image display device 11 starts receiving the third image signal 151 and displays an image based on the third image signal 151.

Figure 4:
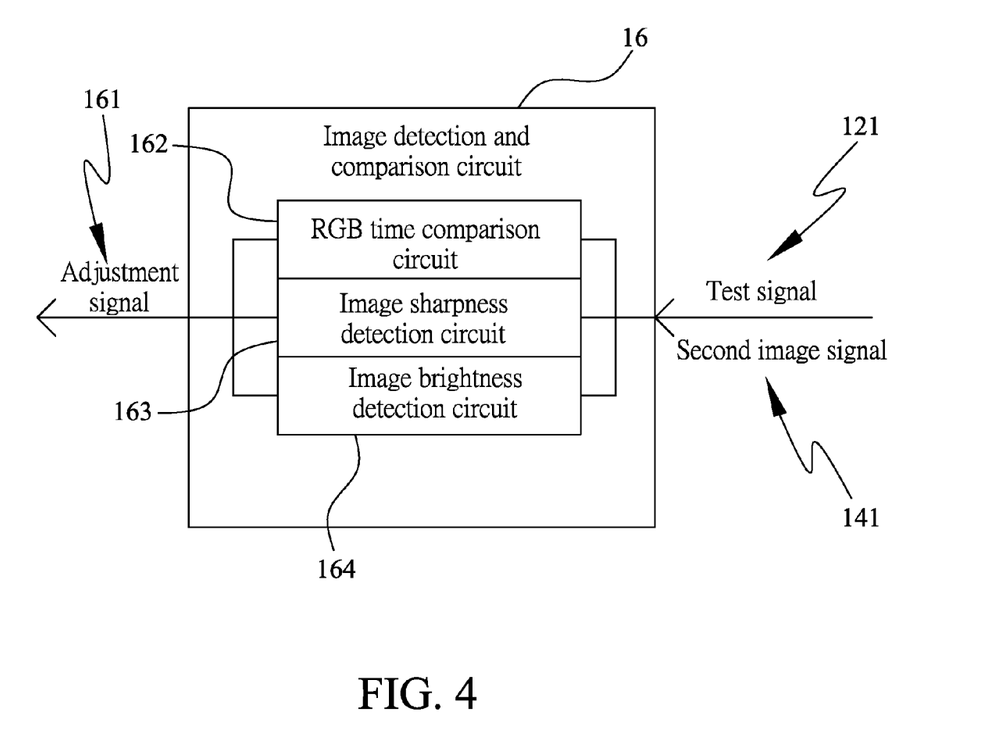
FIG. 4 shows the circuit modules in an image detection and comparison circuit included in the long-range VGA image transmission system of the present invention.

Please refer to FIG. 4. In the illustrated preferred embodiment, the image detection and comparison circuit 16 is composed of an RGB time comparison circuit 162, an image sharpness detection circuit 163, and an image brightness detection circuit 164. And, the adjustment signal 161 generated by the image detection and comparison circuit 16 is composed of an RGB compensation signal, an image sharpness compensation signal and a gain compensation signal.

Figure 5A:
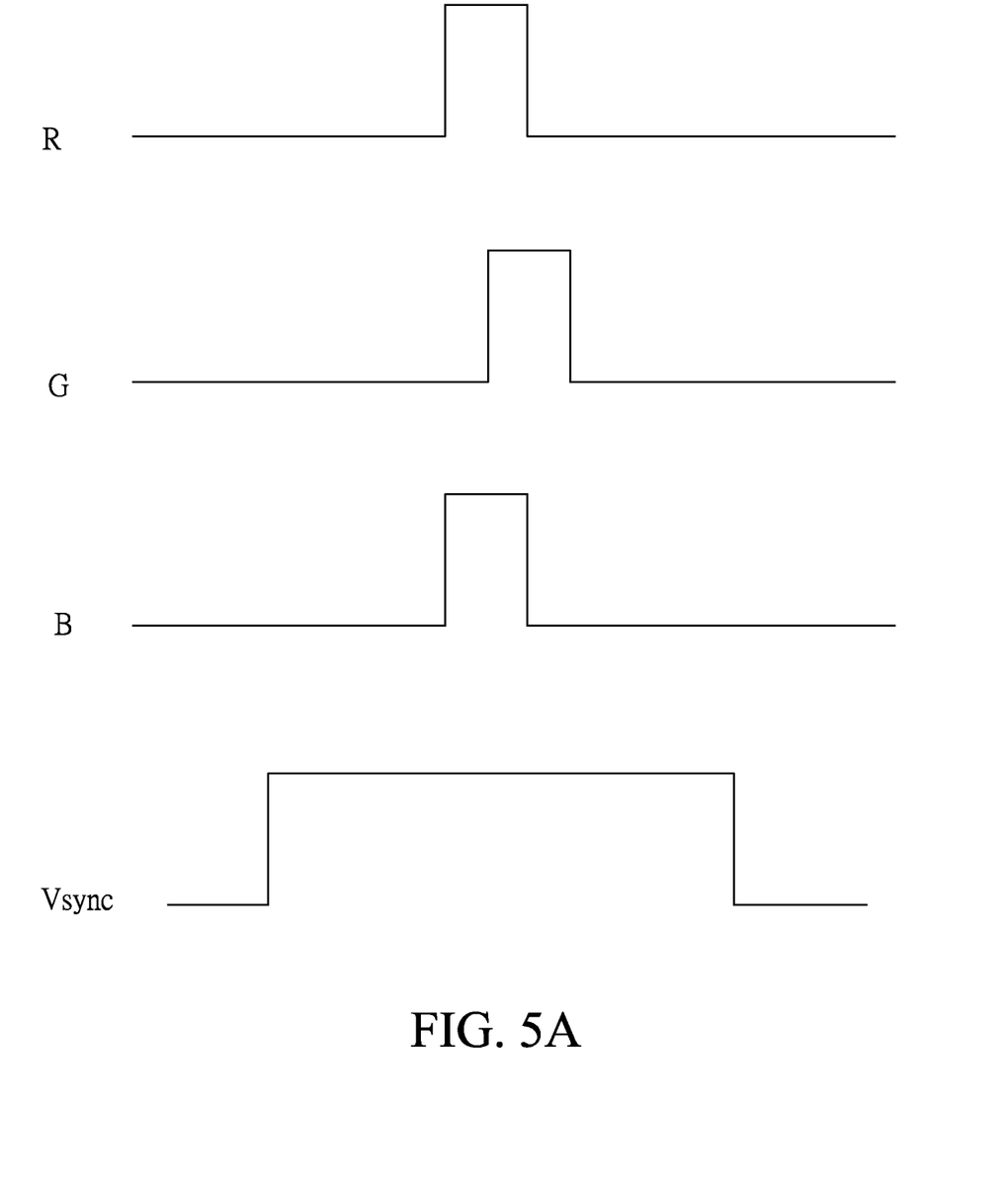
FIGS. 5A to 5D are comparison diagrams showing the time delay detection by an RGB time comparison circuit included in the long-range VGA image transmission system of the present invention.

Please refer to FIG. 5A. The RGB time comparison circuit 162 detects any time delay among three primary light colors of RGB, and uses one of the primary light colors that has the largest time delay as a reference to control and increase delay signals to the other two leading primary light colors until there is not any time delay among the three primary light colors.

Figure 5B:
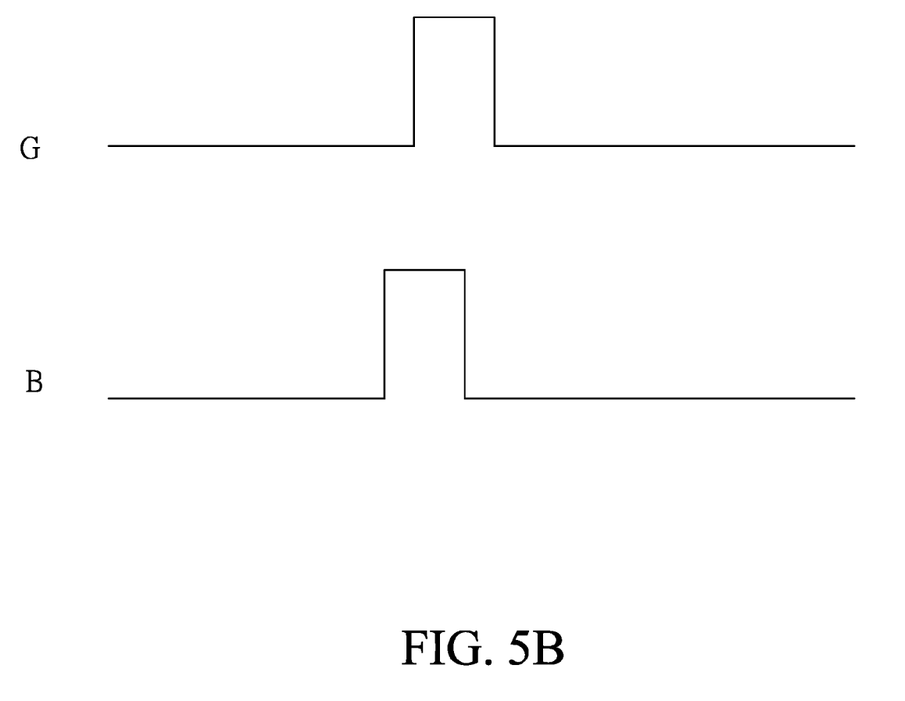
Figure 5C:
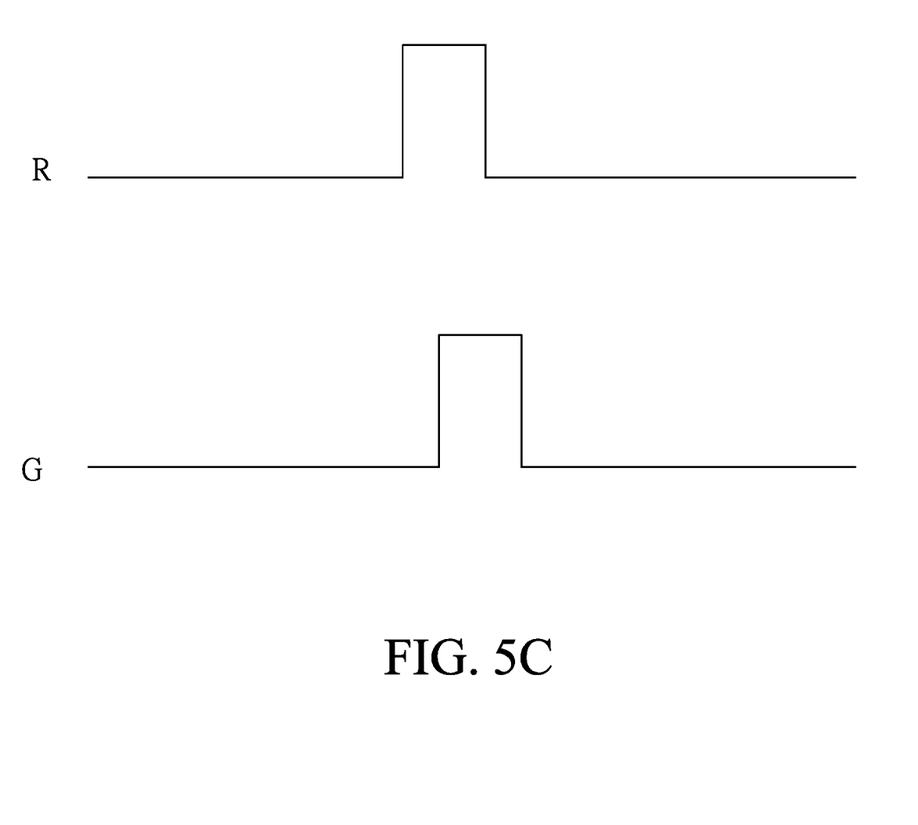
Figure 5D:
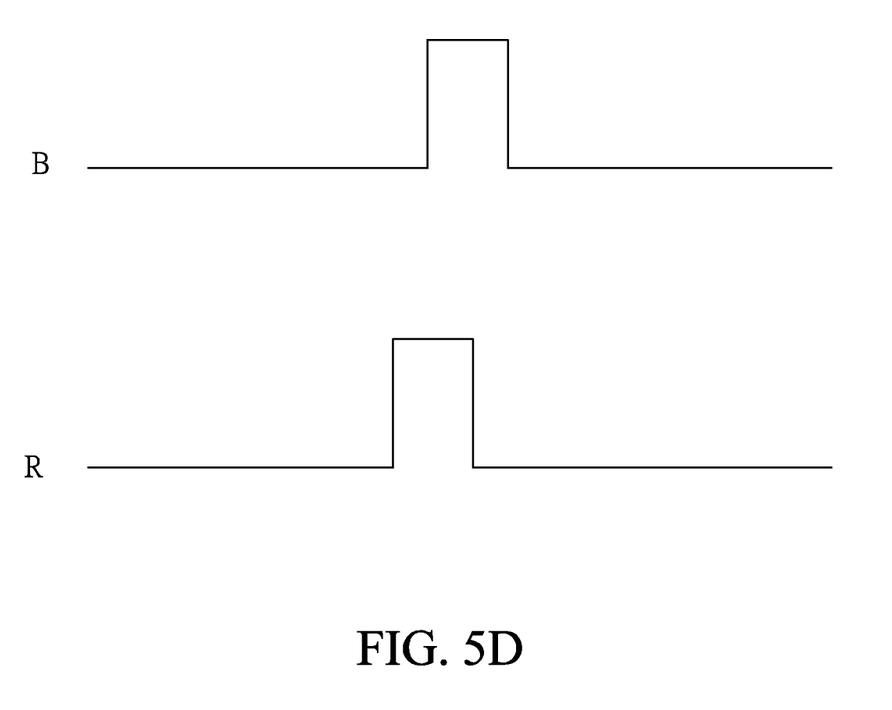

Please refer to FIG. 5B. When the blue (B) voltage signal reaches first prior to the green (G) voltage signal, it is then necessary to control and increase a B delay signal. Or, as shown in FIG. 5C, when the red (R) voltage signal reaches first prior to the G voltage signal, it is then necessary to control and increase an R delay signal. Or, as shown in FIG. 5D, when the R voltage signal reaches first prior to the B voltage signal, it is then necessary to control and increase an R delay signal.

Figure 6:
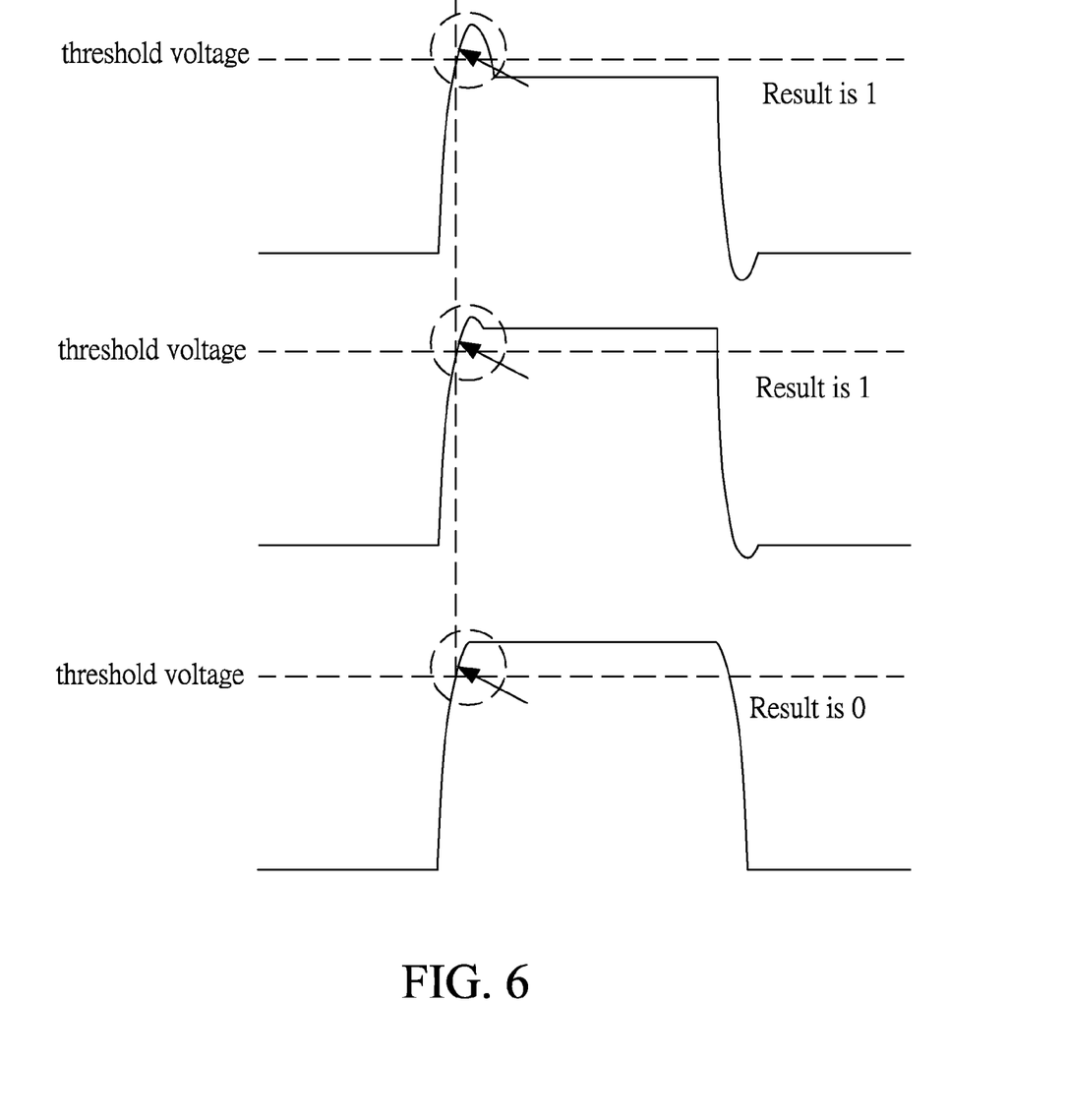
FIG. 6 shows the step-by-step decrease of compensation signal by an image sharpness detection circuit included in the long-range VGA image transmission system of the present invention.

Please refer to FIG. 6. The image sharpness detection circuit 163 detects for a threshold voltage result, so as to determine the way of adjusting the image sharpness. Wherein, in the case of a long-distance transmission, when it is determined the image sharpness needs to be decreased, the image sharpness detection circuit 163 will first set an image sharpness compensation control signal to the highest value thereof and then decreases the compensation signal step by step until the detection result changes. As shown in FIG. 6, the decreasing of the image sharpness compensation control signal stops when the detection result of the recovered signal changes from one (1) to zero (0).

Figure 7:
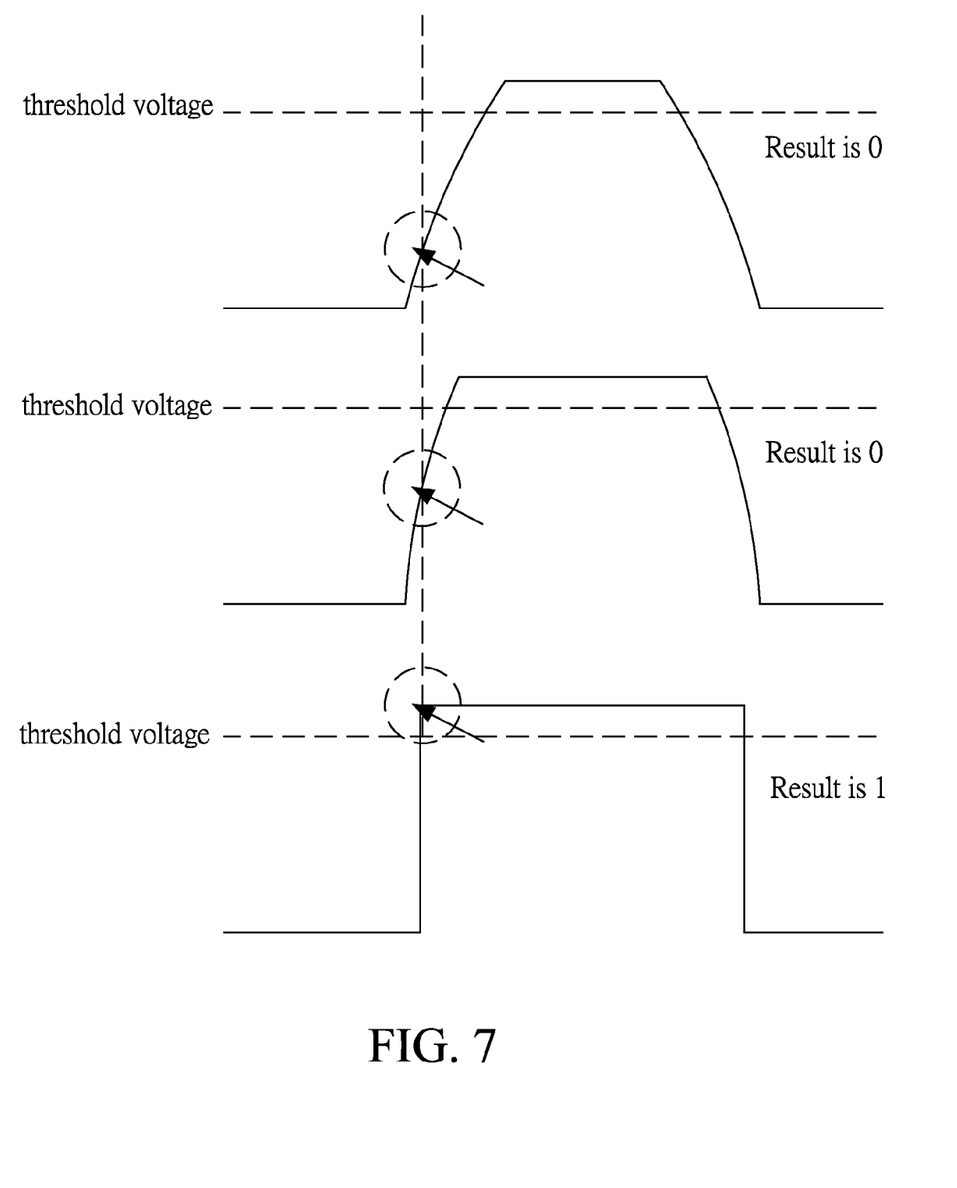
FIG. 7 shows the step-by-step increase of compensation signal by the image sharpness detection circuit included in the long-range VGA image transmission system of the present invention.

On the other hand, please refer to FIG. 7, when it is determined the image sharpness needs to be increased, the image sharpness detection circuit 163 will first set the image sharpness compensation control signal to the lowest value thereof and then increases the compensation signal step by step until the detection result changes. As shown in FIG. 7, the increasing of the image sharpness compensation control signal stops when the detection result of the recovered signal changes from zero (0) to one (1).

Figure 8:
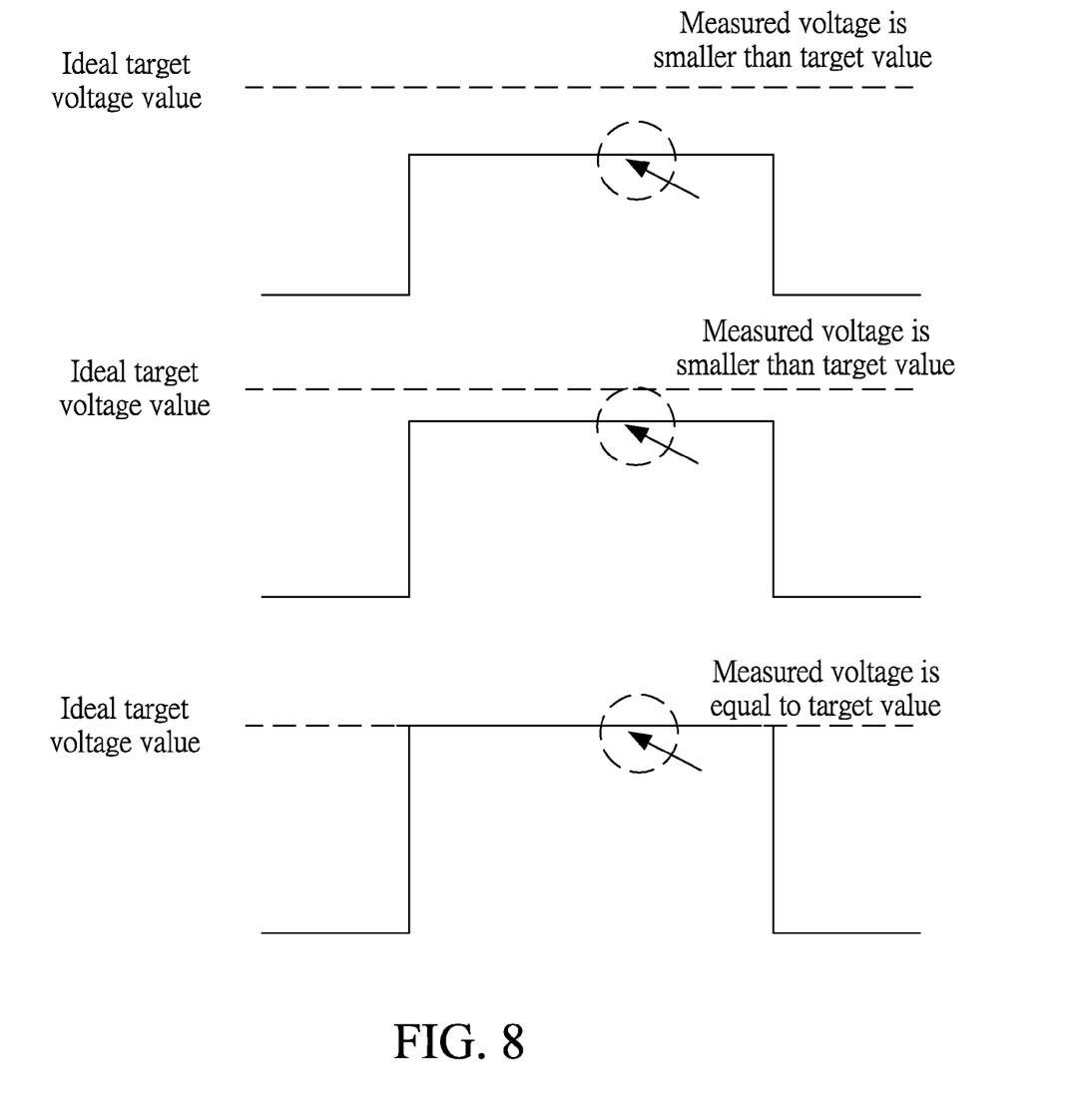
FIG. 8 shows the step-by-step increase of compensation signal by an image brightness detection circuit included in the long-range VGA image transmission system of the present invention.

FIG. 8 shows the automatic adjustment of image brightness by the image brightness detection circuit 164 according to the present invention. As shown, the image brightness detection circuit 164 detects for a target voltage value. When a measured voltage is lower than the target value, the image brightness detection circuit 164 first sets a gain compensation signal to the smallest value thereof and then increases the compensation signal step by step. The increasing of the gain compensation control signal stops only when the detected voltage reaches the ideal target voltage.

On the other hand, when the measured voltage is higher than the target value, the image brightness detection circuit 164 first sets the gain compensation signal to the largest value thereof and then decreases the compensation signal step by step. The decreasing of the gain compensation control signal stops only when the detected voltage reaches the ideal target voltage.

In the present invention, a test signal is added at a signal output end of the long-range VGA image transmission system and an image detection and comparison circuit as well as an image-enhancement compensation circuit are included in the design of the present invention, so that the image signal that becomes distorted after long-distance transmission can be automatically adjusted with the test signal and recovered at the signal receiving end without the need of being corrected and adjusted by an operator with the naked eye. In this manner, it is able to reduce the manpower cost for image adjustment and avoid the condition of still having a distorted image shown on the image display device after an image adjustment by an operator of insufficient experience.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A long-range VGA image transmission system providing automatic image adjustment, comprising:
   an image output source for providing a first image signal;
   a test circuit for providing a test signal;
   an image encoding and transmitting circuit being electrically connected to the image output source and the test circuit for receiving the first image signal and the test signal to generate a transmission signal through encoding;
   an image decoding and receiving circuit being composed of an RGB time comparison circuit, an image sharpness detection circuit, and an image brightness detection circuit, and electrically connected to the image encoding and transmitting circuit for receiving and decoding the transmission signal to generate a second image signal and the test signal;

an image-enhancement compensation circuit being electrically connected to the image decoding and receiving circuit for receiving and transmitting the second image signal and the test signal;

an image detection and comparison circuit being electrically connected to the image-enhancement compensation circuit for receiving the second image signal and the test signal, and detecting and comparing the second image signal with the test signal to generate an adjustment signal; and an image display device being electrically connected to the image-enhancement compensation circuit for receiving the second image signal;

wherein the image-enhancement compensation circuit receives the adjustment signal and then automatically adjusts the second image signal to generate a third image signal; and the image display device starts receiving the third image signal after the adjustment made by the image detection and comparison circuit, and displays an image based on the third image signal.

2. The long-range VGA image transmission system providing automatic image adjustment as claimed in claim 1, wherein the RGB time comparison circuit detects any time delay among three primary light colors of RGB of the second image signal, and uses one of the primary light colors that has a largest time delay as a reference to control and increase delay signals to the other two leading primary light colors until there is not any time delay among the three primary light colors.

3. The long-range VGA image transmission system providing automatic image adjustment as claimed in claim 1, wherein the image sharpness detection circuit detects and determines according to a detection result whether a sharpness of the second image signal needs to be decreased or increased; and wherein, when it is determined the image sharpness needs to be decreased, the image sharpness detection circuit first sets an image sharpness compensation control signal to a highest value thereof and then decreases the compensation signal step by step until the detection result changes; and wherein, when it is determined the image sharpness needs to be increased, the image sharpness detection circuit first sets the image sharpness compensation control signal to a lowest value thereof and then increases the compensation signal step by step until the detection result changes.

4. The long-range VGA image transmission system providing automatic image adjustment as claimed in claim 1, wherein the image brightness detection circuit detects for a target voltage value of the second image signal; and wherein, when a measured voltage value is lower than the target voltage value, the image brightness detection circuit first sets a gain compensation signal to a smallest value thereof and then increases the compensation signal step by step until the detected voltage value changes; and wherein, when a measured voltage is higher than the target voltage value, the image brightness detection circuit first sets the gain compensation signal to a largest value thereof and then decreases the compensation signal step by step until the detected voltage value changes.

5. The long-range VGA image transmission system providing automatic image adjustment as claimed in claim 1, wherein the adjustment signal is composed of an RGB compensation signal, an image sharpness compensation signal, and a gain compensation signal.

6. The long-range VGA image transmission system providing automatic image adjustment as claimed in claim 1, wherein the first image signal has multiple visible zones spaced alternately with multiple invisible zones; and the image encoding and transmitting circuit adding the test signal to the invisible zones of the first image signal.

7. The long-range VGA image transmission system providing automatic image adjustment as claimed in claim 1, wherein the image encoding and transmitting circuit and the image decoding and receiving circuit are electrically connected to each other via a twisted pair cable.

8. The long-range VGA image transmission system providing automatic image adjustment as claimed in claim 7, wherein the twisted pair cable is selected from the group consisting of a CAT5 cable, a CAT5E cable, and a CAT6 cable.

9. A long-range VGA image transmission system providing automatic image adjustment, comprising:

an image output source for providing a first image signal, the first image signal has multiple visible zones spaced alternately with multiple invisible zones;

a test circuit for providing a test signal;

an image encoding and transmitting circuit being electrically connected to the image output source and the test circuit for receiving the first image signal and the test signal, adding the test signal to the invisible zones of the first image signal to generate a transmission signal through encoding;

an image decoding and receiving circuit being electrically connected to the image encoding and transmitting circuit for receiving and decoding the transmission signal to generate a second image signal and the test signal;

an image-enhancement compensation circuit being electrically connected to the image decoding and receiving circuit for receiving and transmitting the second image signal and the test signal;

an image detection and comparison circuit being electrically connected to the image-enhancement compensation circuit for receiving the second image signal and the test signal, and detecting and comparing the second image signal with the test signal to generate an adjustment signal; and an image display device being electrically connected to the image-enhancement compensation circuit for receiving the second image signal;

wherein the image-enhancement compensation circuit receives the adjustment signal and then automatically adjusts the second image signal to generate a third image signal; and the image display device starts receiving the third image signal after the adjustment made by the image detection and comparison circuit, and displays an image based on the third image signal.

10. The long-range VGA image transmission system providing automatic image adjustment as claimed in claim 9, wherein the image detection and comparison circuit is composed of an RGB time comparison circuit, an image sharpness detection circuit, and an image brightness detection circuit.

11. The long-range VGA image transmission system providing automatic image adjustment as claimed in claim 10, wherein the RGB time comparison circuit detects any time delay among three primary light colors of RGB of the second image signal, and uses one of the primary light colors that has a largest time delay as a reference to control and increase delay signals to the other two leading primary light colors until there is not any time delay among the three primary light colors.

12. The long-range VGA image transmission system providing automatic image adjustment as claimed in claim 10, wherein the image sharpness detection circuit detects and determines according to a detection result whether a sharpness of the second image signal needs to be decreased or increased; and wherein, when it is determined the image sharpness needs to be decreased, the image sharpness detection circuit first sets an image sharpness compensation control signal to a highest value thereof and then decreases the compensation signal step by step until the detection result changes; and wherein, when it is determined the image sharpness needs to be increased, the image sharpness detection circuit first sets the image sharpness compensation control signal to a lowest value thereof and then increases the compensation signal step by step until the detection result changes.

13. The long-range VGA image transmission system providing automatic image adjustment as claimed in claim 10, wherein the image brightness detection circuit detects for a target voltage value of the second image signal; and wherein, when a measured voltage value is lower than the target voltage value, the image brightness detection circuit first sets a gain compensation signal to a smallest value thereof and then increases the compensation signal step by step until the detected voltage value changes; and wherein, when a measured voltage is higher than the target voltage value, the image brightness detection circuit first sets the gain compensation signal to a largest value thereof and then decreases the compensation signal step by step until the detected voltage value changes.

14. The long-range VGA image transmission system providing automatic image adjustment as claimed in claim 10, wherein the adjustment signal is composed of an RGB compensation signal, an image sharpness compensation signal, and a gain compensation signal.

15. The long-range VGA image transmission system providing automatic image adjustment as claimed in claim 9, wherein the image encoding and transmitting circuit and the image decoding and receiving circuit are electrically connected to each other via a twisted pair cable.

16. The long-range VGA image transmission system providing automatic image adjustment as claimed in claim 15, wherein the twisted pair cable is selected from the group consisting of a CAT5 cable, a CAT5E cable, and a CAT6 cable.

\* \* \* \* \*